US007508387B2

(12) United States Patent
Coley et al.

(10) Patent No.: US 7,508,387 B2

(45) Date of Patent: Mar. 24, 2009

(54) ON DEMAND CALIBRATION OF IMAGING DISPLAYS

(75) Inventors: Sussan S. Coley, Manchester, NH (US); Victor S. Moore, Boynton Beach, FL (US); Robert M. Szabo, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 764 days.

(21) Appl. No.: 10/677,970

(22) Filed: Sep. 30, 2003

(65) Prior Publication Data

US 2005/0068291 A1 Mar. 31, 2005

(51) Int. Cl.

*G01D 18/00* (2006.01)

*G06F 3/038* (2006.01)

(52) U.S. Cl. .................................... 345/207; 250/252.1

(58) Field of Classification Search ................. 345/207, 345/214; 250/252.1

See application file for complete search history.

(56) References Cited

U.S. PATENT DOCUMENTS

| | | | | |
|---|---|---|---|---|
| 5,331,434 | A * | 7/1994 | Kikinis | 358/474 |
| 6,121,949 | A * | 9/2000 | Ramamurthy et al. | 345/101 |
| 6,172,362 | B1 | 1/2001 | Lingren et al. | |
| 6,194,715 | B1 | 2/2001 | Lingren et al. | |
| 6,409,383 | B1 | 6/2002 | Wang et al. | |
| 6,456,279 | B1 * | 9/2002 | Kubo et al. | 345/173 |
| 6,457,861 | B1 | 10/2002 | Petrick et al. | |
| 6,460,003 | B1 | 10/2002 | Kump et al. | |
| 6,836,260 | B2 * | 12/2004 | Cok | 345/45 |
| 6,903,714 | B2 * | 6/2005 | Tobiya | 345/89 |
| 2001/0015407 | A1 | 8/2001 | Tsujii | |
| 2002/0047550 | A1 * | 4/2002 | Tanada | 315/155 |
| 2003/0067459 | A1 * | 4/2003 | Lim | 345/207 |

OTHER PUBLICATIONS

Blume, H., et al., "Practical Aspects fo Grayscale Calibration of Display Systems", Proc. of the SPIE, vol. 4323, pp. 28-41, Feb. 17-22, 2001.

Michael, F.A., et al., "Luminance Response Calibration Using Multiple Display Channels", Proc. of the SPIE, vol. 4319, pp. 654-659, Feb. 18-20, 2001.

Evanoff, M.G., et al., "Calibration of Medium-Resolution Monochrome CRT Displays for the Purpose of Board Examinations", J. Digit. Imaging, vol. 14, No. 2, May 3-6, 2001.

"Digital Imaging & Communications in Medicine (DICOM) Part 14: Grayscale Standard Display Function", Nat'l. Electrical Man. Assoc., 2003.

"The World's First Full-Color Image Sensor", Foveon, Inc., 2003.

"EIZO / Medical Display Systems", EIZO.

"Calibration TQA", Dome Imaging Systems, 2001.

"Dome Imaging Calibration TQA", Richardson Electronics Engineered Solutions, 2004.

* cited by examiner

*Primary Examiner*—Amr Awad

*Assistant Examiner*—Randal Willis

(74) *Attorney, Agent, or Firm*—Akerman Senterfitt

(57) ABSTRACT

A self calibrating imaging display system (100). The imaging display system (100) can include a screen (110) having integrated photosensors (115). The photosensors can detect luminance values (155) correlating to luminance levels of the screen. The luminance values can be forwarded to a calibration module (130) which can receive the luminance values as an input and generate luminance correction factors (165). The luminance correction factors can be applied to adjust the luminance of the screen. Accordingly, images can be displayed on the screen with proper luminance levels.

7 Claims, 2 Drawing Sheets

ON DEMAND CALIBRATION OF IMAGING DISPLAYS

BACKGROUND OF THE INVENTION

1. Technical Field

This invention relates to the field of imaging displays, and more particularly to imaging display calibration.

2. Description of the Related Art

Imaging displays have become commonplace in the medical industry and are used in medical imaging systems such as magnetic resonance imagers, computer tomography devices, nuclear imaging equipment, positron emission tomography and ultrasound. With the adoption of imaging displays in such critical medical applications, the American College of Radiology (ACR) and the National Electrical Manufacturers Association (NEMA) recognized an emerging need for a standard method addressing the transfer and presentation of images. Accordingly, the ACR and NEMA formed a joint committee to develop the Digital Imaging and Communications in Medicine (DICOM) standard.

DICOM Part 14 was developed to provide an objective, quantitative mechanism for mapping digital image values into a given range of luminance. Specifically, DICOM Part 14 specifies a standardized display function for display of grayscale images. More particularly, DICOM Part 14 defines a relationship between digital image values and displayed luminance values based upon measurements and models of human perception over a wide range of luminance. DICOM Part 14 further specifies calibration parameters that can be used to calibrate emissive display systems.

When calibrating a display, a characteristic curve of the display's characteristic luminance response can be measured using a test pattern. The test pattern typically consists of a square measurement field comprising 10% of the total number of pixels displayed by the system. The measurement field is placed in the center of the display. A full screen uniform background surrounds the square measurement field. The background should have a luminance that is 20% of the display's maximum luminance.

Presently, display calibration is a time-consuming and inefficient process. As such, display calibration is error prone. Further, because of the time involved, display calibration is performed on a periodic basis, for example every six months, so as not to be too inefficient. A photometer can be manually held to the face of the display in the center of the measurement field. The display driving level (DDL) of the measurement field then can be stepped through a sequence of different values, starting with zero and increasing at each step until the maximum DLL is reached. The luminance of the measurement field can be measured by the photometer at each DDL and the luminance values recorded. The DDL is a digital value given as an input to a display system to produce a luminance. A plot of the luminance vs. DDL then can be generated to model the characteristic curve of the display system over the luminance range. The plot of the measured luminance characteristic curve then can be compared to a grayscale standard display function.

To calibrate a display system, the luminance characteristics of the display system can be adjusted to compensate for differences between the measured luminance characteristic curve and the grayscale standard display function. For example, the minimum and maximum luminance intensity can be adjusted using a display system's black and white adjustments. Further, some imaging systems are provided with display controllers which can provide an input-to-output correction through the use of a lookup table (LUT) to optimize the grayscale presentation. Such systems are typically provided with software that receives measured luminance values and compares the measured luminance values to the LUT to determine correction factors.

As noted, typical display system calibration cycles are six months. If a medical imaging system is not found compliant, an imaging center can undergo heavy fines. Further, repeat offenders can lose their operating license. In the case that a misdiagnosis is induced by a display which is out of calibration, a medical imaging center operating the display can be held legally responsible. Moreover, the medical imaging center would likely become entangled in costly litigation.

SUMMARY OF THE INVENTION

The invention disclosed herein relates to a self calibrating imaging display system. The imaging display system can include a screen having integrated photosensors. The photosensors can detect luminance values correlating to luminance levels of the screen. The photosensors also can detect color values correlating to color levels of the screen. The luminance values can be forwarded to a calibration module which can receive the luminance values as an input and generate luminance correction factors. The luminance correction factors can be applied to adjust the luminance of the screen. Accordingly, images can be displayed on the screen with proper luminance levels.

The self calibrating imaging display system can include a display having a screen and at least one photosensor integrated with the screen. For example, an array of photosensors can be provided. The photosensors can be horizontally and vertically dispersed over a portion of the screen, for example over a region including at least 90% of the surface area of the screen. The photosesors can be formed into the screen or formed on a transparent sheet which is disposed on the screen. The photosensors can detect luminance values correlating to luminance levels of the screen.

The imaging display system can include a calibration module. The calibration module can receive input from the photosensors correlating to the luminance values and determine luminance correction factors which can be applied to adjust luminance of the screen. Different ones of the luminance correction factors can be applied to different regions of the screen. The calibration module can automatically update the luminance correction factors at predetermined intervals. The calibration module also can update the luminance correction factors responsive to a user input. Further, the calibration module can generate a calibration record upon an update of the luminance correction factors.

A method of calibrating an imaging display system can include the step of receiving luminance values from a photosensor integrated with a screen of a display. The photosensor can detect luminance levels of the screen. The method also can include the step of determining luminance correction factors from the detected luminance levels. The luminance correction factors can be applied to adjust luminance of the screen.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

An embodiment in accordance with the present invention relates to a self calibrating imaging display system. The imaging display system can include a screen having integrated photosensors. For example, an array of photosensors can be provided. In one arrangement, the photosensors can be formed into the screen. Alternatively, the photosensor can be formed on a transparent sheet which is disposed on the screen. The photosensors can detect luminance values correlating to luminance levels of the screen.

The luminance values can be forwarded to a calibration module which can receive the luminance values as an input and generate luminance correction factors. The luminance correction factors can be applied to adjust luminance of the screen. Accordingly, images can be displayed on the screen with proper luminance levels. The calibration module can automatically update the luminance correction factors at predetermined intervals. Further, the calibration module can update the luminance correction factors responsive to a user input.

Notably, the present invention also can be applied to calibration of color levels. For example, individual color levels can be detected and the calibration module can generate color correction factors. In either case, the calibration module can generate a calibration record upon the luminance correction factors being updated.

Figure 1:
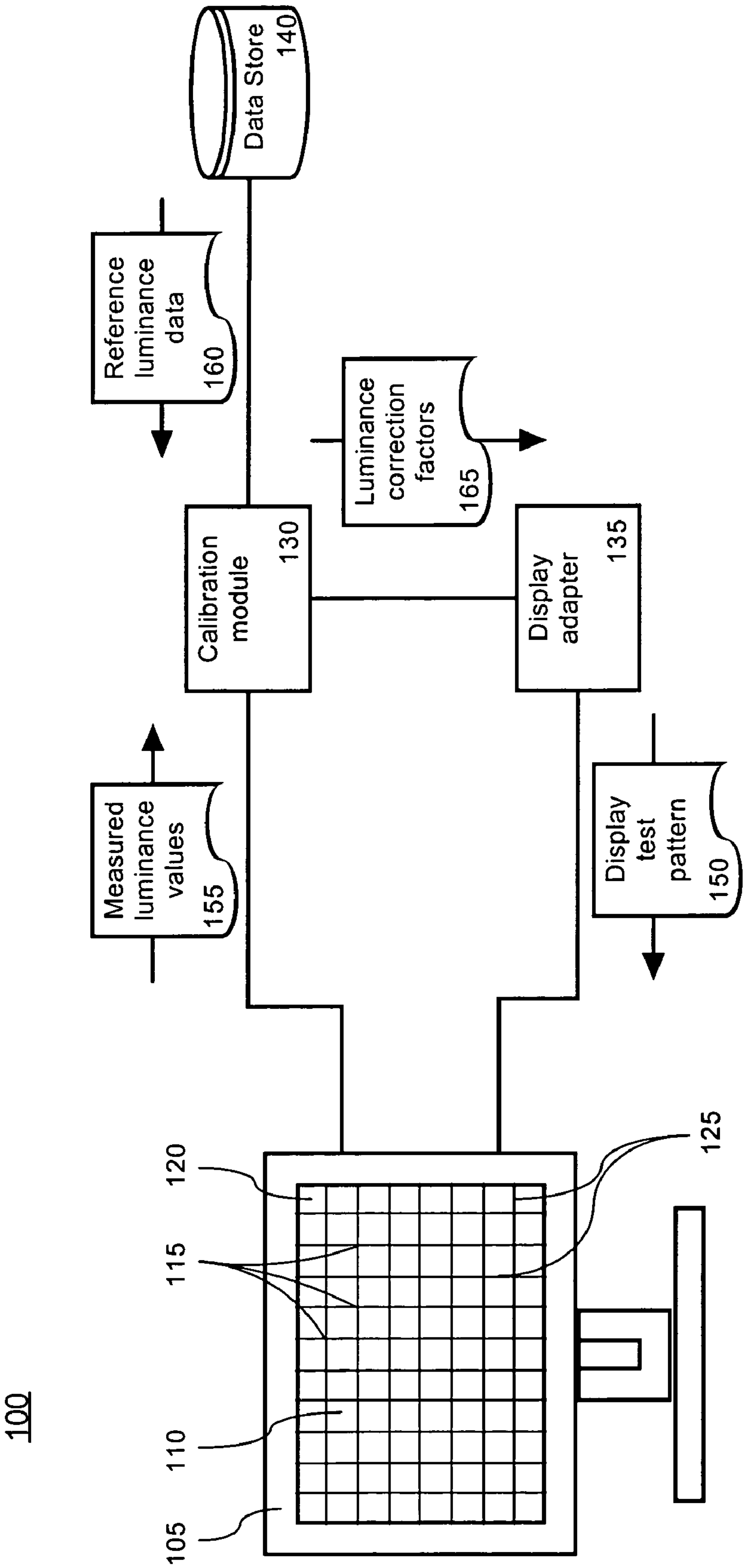
FIG. 1 is a schematic diagram of an imaging display system which is useful for understanding the present invention.

Referring to FIG. 1, a schematic diagram of an imaging display system 100 which is useful for understanding the present invention is shown. The imaging display system can include a display 105 having a screen 110, a calibration module 130, a display adapter 135 and a datastore 140. The calibration module 130, display adapter 135 and datastore 140 can be incorporated into a computing system, for example a general purpose computer or an application specific computer. The calibration module 130 can be can be realized in hardware, software, or a combination of hardware and software.

The display adapter 135 can include hardware in the form of a graphics card and software in the form of display drivers. Display adapters are well known to the skilled artisan. Exemplary display adapters that can be used with the present invention are models Quadro4 900XGL, Quadro4 980XGL, and Quadro4 FX1000 available from Nvidia Corporation of Santa Clara, Calif. and model FireGL4 available from ATI Technologies, Inc. of Markham, Ontario Canada.

The display 105 can include a cathode ray tube (CRT), a liquid crystal display (LCD), a liquid crystal on silicone (LCOS) display, a plasma display or any other type of display that can be used to present images and that can be calibrated as disclosed herein. Notably, the display 105 can be monochrome or color. Further, the display 105 can be used for medical or non-medical applications.

Photosensors 115 can be integrated into the screen 110 of the display 105. The photosensors 115 can be any devices which generate an output correlating to an amount of received luminance. In an arrangement where the photosensors 115 are used to detect color levels, the photosensors 115 can be any devices which generate an output correlating to received color levels. For example, in the case that luminance levels are being detected, the photosensors 115 can be photoelectric cells. Photoelectric cells are devices whose electrical characteristics vary in accordance with an amount of light that is incident upon the photoelectric cells. For example, the electrical resistance of a photoelectric cell can vary as an amount of light incident on the photoelectric cell varies. In another arrangement, the photosensors 115 can be photovoltaic cells, or photovoltaic transistors, which generate an output voltage or output current that correlates to an amount of received light. Still, the invention is not so limited and other types of luminance detecting devices can be used as the photosensors 115. In the preferred arrangement, the photosensors 115 are small enough to minimize interference with a displayed image.

The photosensors 115 can be arranged to form an array. In particular, the photosensors can be horizontally and vertically dispersed over any portion of the screen or the whole screen. For example, the photosensors can be dispersed over at least 90% of a surface area of the screen 110. Notably, measured luminance of the screen 110 can vary among different regions of the screen. This is especially true for aging CRT's. Dispersing the array of photosensors 115 over a such a large portion of the screen 110 enables the luminance to be measured at different regions of the screen 110 so that appropriate luminance correction can be applied, as is further discussed below.

The horizontal and vertical spacing of the photosensors 115 can be selected to achieve a desired sensor density. Luminance values for points located between photosensors 115 can be determined by interpolating the luminance values measured by proximately located photosensors 115. Although interpolation can provide fairly accurate luminance data for points located between photosensors 115, interpolation is still an approximation, nonetheless. Thus, a greater density of photosensors 115 can provide higher accuracy luminance data as compared to a lower density of photosensors 115. However, an increased density of photosensors 115 can result in greater interference with the presentation of images generated by the display 105.

The photosensors 115 can be formed on a transparent sheet 120 which is disposed on the screen 110. For example, the photosensors 115 can be formed on the transparent sheet 120 and the transparent sheet 120 can be permanently or removeably affixed to the screen 110. Alternatively, the photosensors 115 can be formed on the screen 110. The transparent sheet 120 can be affixed to the screen 110 over the photosensors 115 to provide a protective layer. The transparent sheet 120 can be made from a clear material, such as glass, plastic or any other transparent material which can be suitably affixed to the screen 110. Further, the transparent sheet 120 can be attached to the screen 110 using any suitable technique. For instance, in the case that the transparent sheet 120 is permanently attached to the screen 110, the transparent sheet 120 can be attached to the screen 110 with an optically transparent adhesive. An exemplary optically transparent adhesive is adhesive 8141 available from 3M Corporation of St. Paul, Minn.

Conductors 125 can be provided to provide an electrical connection to the photosensors 115. In one arrangement, the diameter of the conductors 125 can be less than approximately 0.4 mm to minimize interference with the presentation of images generated by the display. In another arrangement, conductors 125 which are substantially optically transparent can be used. For example, the conductors 125 can be cadmium tin oxide (CTO) or specially treated calcium-aluminum oxide, known as C12A7. In its native state, calcium-aluminum oxide is an insulator. Calcium-aluminum oxide can be made to be conductive, however, by heating its crystals at 1300° C. for 2 hours in a hydrogen atmosphere and shining ultraviolet light on the annealed material.

In an alternative arrangement, the photosensors 115 can be formed into the screen 110. For example, in the case that the display 105 is an LCD, LCOS or plasma display, the photosensors 115 can be integrated with pixels of the screen 110 using multi-layer optics. In such an arrangement, conductors which are electrically connected to the photosensors 115 can be routed behind the screen so that the conductors do not interfere with images generated by the display.

In operation, for example during calibration, a display test pattern 150 can be forwarded to the display 105 from the display adapter 135. In accordance with Digital Imaging and Communications in Medicine (DICOM) Part 14, the display test pattern 150 can consist of a square measurement field comprising 10% of the total number of pixels displayed by the display 105. Typically, the measurement field is placed in the center of the screen 110. The display driving level (DDL) of the measurement field then can be stepped through a sequence of different values, starting with zero and increasing at each step until the maximum DLL is reached. The luminance of the measurement field can be measured by the photosensors 115 at each DDL and the luminance values recorded in the data store 140. Because the present invention enables luminance to be measured at the different regions of the screen 110, the measurement field can be placed at the different regions and luminance measurements can be made for those regions. The luminance measurements for each region can be made using photosensors 115 disposed in the respective regions.

Measured luminance values 155 from the photosensors 115 can be forwarded to the calibration module 130. For instance, measured luminance values 155 can be forwarded to the calibration module 130 over a communications link, such as a parallel port, a serial port, a universal serial bus (USB), an IEEE-1394 serial bus (FireWire or i.Link), a wireless communications link, such as blue tooth or IEEE 802.11, or any other suitable communications link. To minimize the number of communications links between the display 105 and the calibration module 130, a data acquisition unit (not shown) can be provided to receive measured luminance values 155 from the photosensors 115. The data acquisition unit can be incorporated into the display, or provided as an external unit. The data acquisition unit can be used to transmit the luminance values 155 to the calibration module 130. For example, the data acquisition unit can transmit the measured luminance values 155 sequentially and/or in a compressed format over a single communications link.

The calibration module 130 can receive the measured luminance values 155 and compare the measured luminance values 155 to reference luminance data 160. The reference luminance data 160 can be contained in a look-up-table (LUT) on the data storage 140 and accessed as required. The calibration module 130 can generate luminance correction factors 165 based upon the results of the comparison of the measured luminance values 155 to the reference luminance data 160. The luminance correction factors 165 then can be forwarded to the display adapter 135.

The display adapter 135 can use the luminance correction factors 165 to implement display adapter 135 calibration adjustments. For example, the display drivers can be updated to adjust DDL's and compensate for differences between the measured luminance values 155 and the reference luminance data 160. Notably, different calibration adjustments can be made to different regions of the screen 110, for example if the display is an LCOS, LCD or plasma display. Accordingly, variations in luminance in different regions of the screen 110 can be corrected. Further, the display 105 can be provided with luminance controls that can be calibrated via the display adapter 135. For example, the minimum and maximum luminance intensity can be adjusted within the display adapter 135.

A calibration record can be generated each time the calibration routine is performed. The calibration record can include the measured luminance values 155 and the luminance correction factors 165. For example, a calibration record can be generated by the calibration module 130 and stored on the data store 140. The calibration record can be an entry into a database or a log file which is generated. The calibration record also can be printed.

At this point is should be noted that the calibration routine can be manually started at any time to update the luminance correction factors. For example, the calibration routine can be started responsive to a user input. The calibration routine also can be performed automatically. For example, the calibration routine can be scheduled to automatically execute at periodic intervals. In another arrangement, the calibration routine can be performed each time the display system 100 is turned on, or after each time an image is displayed on the screen 110.

Figure 2:
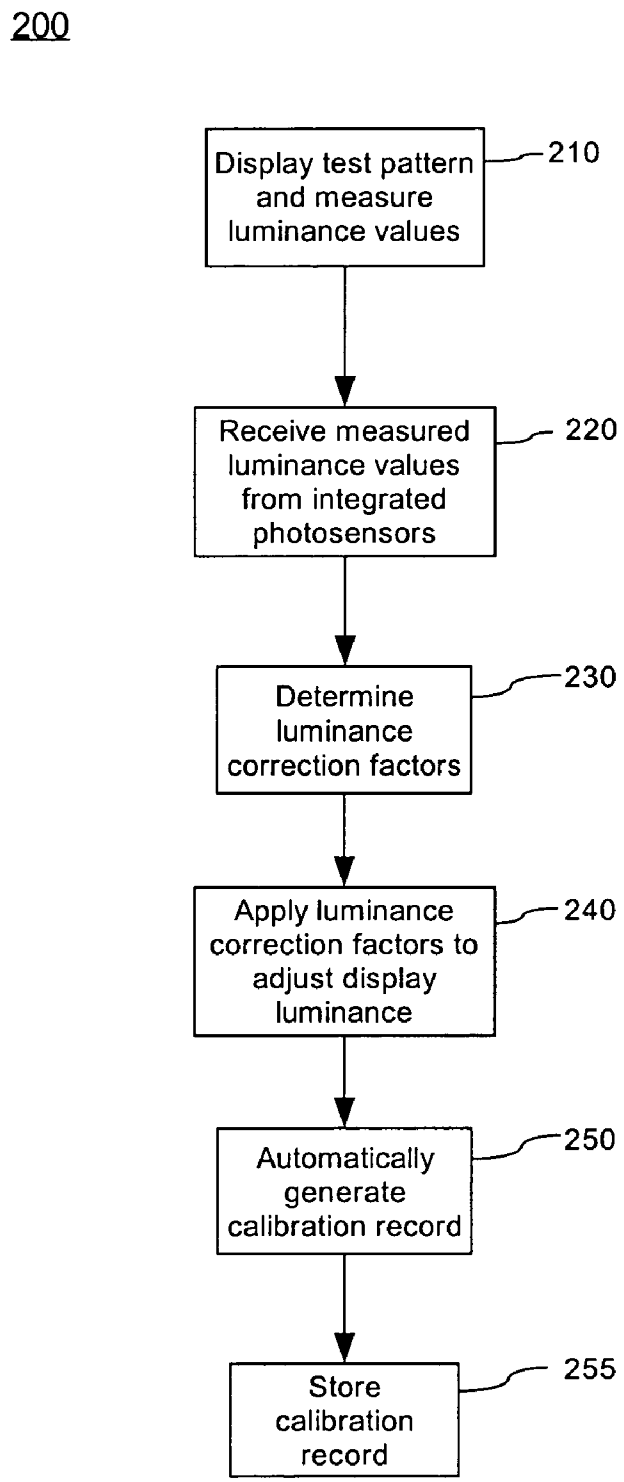
FIG. 2 is a flow chart which is useful for understanding the present invention.

Referring to FIG. 2, a flow chart which is useful for understanding the calibration routine of the present invention is shown. Beginning at step 210, a test pattern can be displayed on a display screen and luminance values correlating to luminance levels of the screen can be measured using photosensors integrated with the screen. Referring to step 220, the calibration module can receive measured luminance values from the photosensors. Proceeding to step 230, the calibration module can determine the luminance correction factors, for example by comparing the measured luminance factors to reference luminance data. The luminance correction factors then can be applied to adjust the display luminance, as shown in step 240. For instance, display drivers associated with a display adapter can be updated. Lastly, a calibration record can be automatically generated, as shown in step 250. At step 255, the calibration record can be stored. For instance, the calibration record can be printed and/or stored to a data store. Further, a system administrator can configure a specific destination for calibration record storage, for example based on work flow process and/or maintenance policies.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of calibrating an imaging display system comprising the steps of:

forwarding a display test pattern from a display adapter to a display of the display system, the display test pattern including a measurement field comprising approximately 10% of a total number of pixels displayed by the display, wherein the measurement field can be placed at different regions of a display screen of the display;

causing the measurement field to be stepped through a sequence of values from zero and increasing at each step up to a maximum display driving level (DDL);

receiving luminance and color values from a plurality of photosensors associated with the display screen, said photosensors detecting distinct luminance and color levels at the different regions of said screen;

from said detected luminance and color levels, determining a plurality of luminance and color correction factors by comparing the detected luminance and color values to reference luminance and color data; and applying the determined luminance and color correction factors to the different regions of said screen so as to adjust luminance and color of said screen at the different regions, each region spanned by a corresponding measurement field.

2. The method of calibrating an imaging display system according to claim 1, wherein said at plurality of sensors comprises an array of photosensors.

3. The method of calibrating an imaging display system according to claim 2, wherein said array of photosensors comprises photosensors horizontally and vertically dispersed over said screen.

4. The method of calibrating an imaging display system according to claim 3, wherein said portion is a region of said screen comprising at least 90% of a surface area of said screen.

5. The method of calibrating an imaging display system according to claim 1, further comprising the step of automatically updating said luminance correction factor at predetermined intervals.

6. The method of calibrating an imaging display system according to claim 1, further comprising the step of updating said luminance correction factor at said different regions responsive to a user input.

7. The method of calibrating an imaging display system according to claim 1, further comprising the step of generating a calibration record upon an update of said luminance correction factor.

* * * * *